United States Patent
Henry

(10) Patent No.: US 9,145,085 B2
(45) Date of Patent: Sep. 29, 2015

(54) REVERSE ACTIVATED SIGNALING CIRCUIT

(71) Applicant: Gregory D'Oliveira Henry, West Orange, NJ (US)

(72) Inventor: Gregory D'Oliveira Henry, West Orange, NJ (US)

(*) Notice: Subject to any disclaimer, the term of this patent is extended or adjusted under 35 U.S.C. 154(b) by 72 days.

(21) Appl. No.: 14/010,624

(22) Filed: Aug. 27, 2013

(65) Prior Publication Data

US 2015/0061857 A1 Mar. 5, 2015

(51) Int. Cl.
*B60Q 1/26* (2006.01)
*B60Q 1/46* (2006.01)
*B60Q 1/22* (2006.01)

(52) U.S. Cl.
CPC ... *B60Q 1/46* (2013.01); *B60Q 1/22* (2013.01)

(58) Field of Classification Search
None
See application file for complete search history.

(56) References Cited

U.S. PATENT DOCUMENTS

| | | | |
|---|---|---|---|
| 3,343,123 A * | 9/1967 | Troesh | 340/474 |
| 4,196,415 A * | 4/1980 | Haar et al. | 340/474 |
| 4,471,411 A | 9/1984 | Graham et al. | |
| 4,838,603 A | 6/1989 | Masoero et al. | |
| D302,595 S | 8/1989 | Spada et al. | |
| D305,692 S | 1/1990 | Yoshida | |
| D323,900 S | 2/1992 | Falck et al. | |
| 2003/0095041 A1 * | 5/2003 | Perlman et al. | 340/463 |
| 2005/0057162 A1 * | 3/2005 | Kover et al. | 315/77 |
| 2005/0057941 A1 * | 3/2005 | Pederson et al. | 362/542 |
| 2005/0134448 A1 * | 6/2005 | Perlman et al. | 340/468 |

* cited by examiner

*Primary Examiner* — Julie Lieu
(74) *Attorney, Agent, or Firm* — Michael J. Brown

(57) ABSTRACT

The present invention provides an enhanced safety signaling circuit for vehicles, in particular when a vehicle is traveling in reverse. The invention is connected to a vehicle's reverse light circuit and to signaling circuits, such as signal light circuits. The invention causes the signaling circuits to activate each time the vehicle is set to reverse. The invention can be used with existing automotive emergency flasher and reverse light circuits, or to additional light or acoustic signaling devices. The invention is designed to connect to a vehicle's existing circuits by various wire-splice connections without interfering with the normal location or operation of the existing circuits, and allows electronic components to energize the emergency flashing light circuits during the reversing process of a vehicle. The signaling can flash in an alternating pattern or simultaneously.

7 Claims, 2 Drawing Sheets

REVERSE ACTIVATED SIGNALING CIRCUIT

FIELD OF INVENTION

The present invention relates to the field of vehicle safety, specifically to the use of signal lights or alarms to alert vehicle operators and people in the area of a vehicle and the direction of travel of the vehicle.

BACKGROUND

Often time motorists are unable to recognize when other motorists are backing up, due to malfunctioning reverse lights or blown bulbs or fuse. An additional reverse alert signal light would be very beneficial to the operator of the reversing vehicle, for other motorists and other people in the vicinity of the vehicle. A method for pair of reverse lights to let others know that a driver is reversing has been addressed in more than one prior patent. However, those prior patents are for a constantly lit lighting signal. These current reverse signaling designs and functions are believed to be very beneficial, because they are currently in use today by auto makers around the world, but need enhancement. One of the current invention that utilizes lighting as a signal for reversing is represented by U.S. Pat. No. D323900 delivers a continuous illumination of lights from the rear of an automobile during reversing of the vehicle. Another one of those reverse light invention and patent represented by U.S. Pat. No. D305692 provides a combination of lights illuminating continuously from the rear of the automobile during the reversing of the vehicle.

There are also other audible reverse signals also and two of those patents which use audible technologies are represented by the U.S. Pat. Nos. 4,196,415 and 3,343,123. Both of the stated patent references are very different from the present invention technology, which utilizes the existing reverse and four-way flasher light circuit as a means of providing additional signaling when a vehicle is backing up.

SUMMARY OF THE INVENTION

The invention herein presented, is an improvement over current patented inventions, because the invention connects across the terminals of existing automotive four-way flasher signal and reverse lights circuits. This invention can utilize a pair of additional flashers or the additional flashers can be omitted when the existing four-way light flasher is used. Optionally, components for making the light flash and illuminate in an alternative signaling pattern can be added to the circuit, such as resistors of unequal Ohms values.

However, the present invention represents a dynamic improvement because, by using existing lighting wiring, the invention also utilizes standard in dash signals for the driver of the vehicle to see when the vehicle is in reverse and also provides an additional pair of lights in the front and rear of the vehicle for external motorists or pedestrians to see when the vehicle is in reverse when the vehicle is equipped with this invention.

This safety improvement is brought about through the addition of an oscillator circuit that operates with existing circuits which are used in combination with the invention. The source of power for the entire invention circuitry is generated from the power of the existing reverse light circuit. The power from existing reverse light circuit is then used to activate the hazard or emergency light circuit of a vehicle equipped with same.

A preferred embodiment of the invention uses conventional electronic circuit board and components. The major improvement this invention provides is that all of the circuitry, including the relays, will fit inside a metal or plastic casing that is used and are available in vehicle industry-wide manufacturing today. The cases that can house the invention can be designed to be installed in concealed places in the equipped vehicles. In fact, the only person who may see or make contact with the device embodying the invention is an automotive technician, who may be working on the equipped vehicle. Evidently, because the inventive device will be constructed from existing components, the cost is predicted to be of minimal value.

The interconnection between the inventive device and the existing wire connection will be done through compatible vehicle wire connectors. The connectors for the invention allow the reverse light circuitry and the hazard or emergency light circuit to be connected together. This connection of both does not cause any interruption in either the reverse or hazard light circuits. Due to the small circuit size, the inventive device will occupy its own space in the equipped vehicle, upon installation.

For vehicles which do not include a hazard or emergency light circuit, an alternate embodiment of the invention includes an additional circuit component to intermittently activate lights on the vehicle, including headlights, tail lights and/or turn signals.

The circuit of the invention includes a diode to prevent back flow of electrons into the reverse light circuit when the flasher light circuit is in use. This type of configuration is desirable because the inventive device is designed to be in conjunction with both the reverse and the flasher light circuit.

The primary objective of the invention is to provide a means for vehicle safety whereby other pedestrians and motorists can see when a vehicle is backing up. Also the driver is reminded that his or her vehicle's reverse is engaged.

Another objective of this invention is provide a reminder to vehicle operator that that their vehicle is in reverse demonstrated by the two in-dash turn signal lights which would be flashing when the device is activated.

Another objective of this invention is to provide a four way flashing lights, which would flash alternatively during activation.

A further object of the invention is to provide an interconnector that provides electrical contact to the automotive flasher terminals while allowing the flasher to operate normally in its normal condition or location.

An additional objective of the invention is to provide a universal connection features within the connector of all vehicles, so that the invention can be easily installed on all vehicles regardless of the vehicle's or flasher and reverse light circuits.

Another objective of the invention is to provide a technology that will accomplish what is stated above and is easy to install by trained personnel. A further object of the invention is to provide a technology that will accomplishes what has been claimed economical to manufacture.

DETAILED DESCRIPTION OF THE PREFERRED EMBODIMENT

Figure 1:
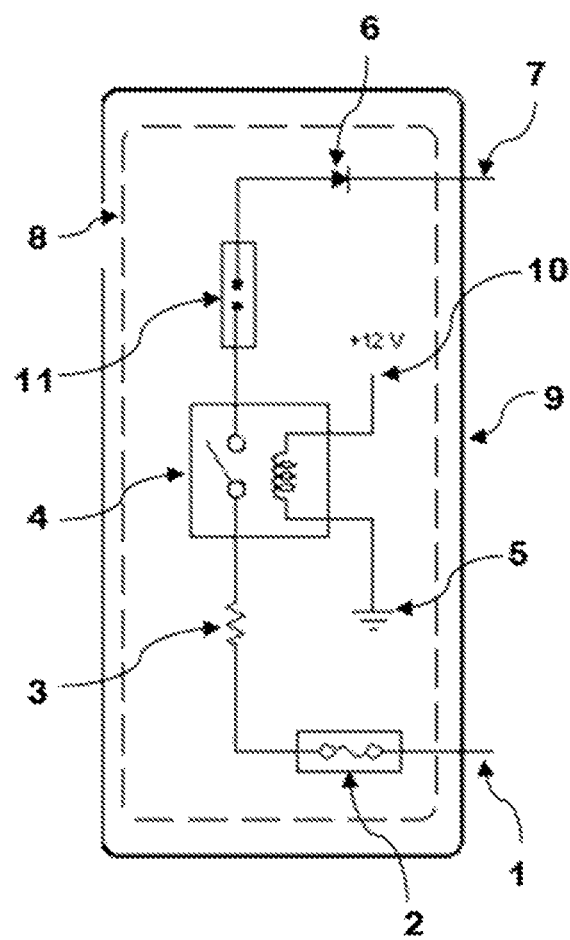
FIG. 1 is a circuit diagram, showing an embodiment of the invention.

The invention circuit 8 is shown in FIG. 1 as a single circuit layout, contained within a casing 9. The inventive circuit 8 may be installed in a vehicle as a single device, or multiple individual devices.

The circuit design 8 is comprised of electrical components connected in series: an input 1, drawing an electrical signal from an existing vehicle signal light circuit, a current flow overload circuit interrupting component or fuse 2, a current flow resistance component or resistor 3, a switch 4, a current flow directional component or diode 6, and an output 7 to the existing vehicle signal light circuit. Switch 7 is further comprised of external input 10 and ground 5, connected to an existing vehicle reverse light circuit. A circuit opening and closing component or flasher 11 may also be provided in the circuit.

Input 1 to the invented circuit provides the power source for the invention, drawing an electrical signal from the existing vehicle signal light circuit of the equipped vehicle. The electrical signal from the input 1 is then sent to the switch 7. Input 1 may also be connected to an external signaling device such as additional lighting or an acoustic alarm.

Overload circuit interrupting component 2 is preferably a fuse and protects the circuit. Overload circuit interrupting component 2 may be omitted in the inventive circuit, but is preferred for protection of the circuit components. When included, overload circuit interrupting component 2 is electrically connected to pass the electric signal from input 1 to the switch 4.

Current flow resistance component 3 is preferably a resistor. Resistance component 3 may be omitted in the inventive circuit, but is part of the preferred embodiment. The resistance component 3 may be of different values in the inventive circuit when two or more circuits of the invention are used, so that the different resistance values causes an alternative flashing among the separate inventive circuits. The resistance component 3 is electrically connected between input 1 and switch 7.

Switch 4 provides an external control for activating the inventive circuit. External input 10 and ground 5 is preferably connected to the reverse light circuit of the vehicle, so that when the reverse light circuit is activated, switch 4 is moved to the closed position, completing the electric circuit 8. Switch 4 may be a relay, a device that is usually consists of an electromagnet and an armature, by which a change of current or voltage in one circuit is used to make or break a connection in another circuit or to affect the operation of other devices in the same or another circuit. Switch 4 is electrically connected to current flow directional component 6.

Current flow directional component 6 is preferably a diode. The diode in the inventive circuit is used to prevent any back feed into the circuit from the vehicle's lighting or signaling systems.

Output 7 is preferably electrically connected to the vehicle's existing light circuits, but can also be connected to an external signaling device such as additional lighting or an acoustic alarm.

The external signaling provided by the circuit can be provided by several different means. The inventive circuit can be spliced into a vehicle's existing hazard or emergency light wiring, so that when switch 4 is closed, the circuit provides the same results, namely an oscillating light display, as if the vehicle operator had manually activated the hazard or emergency lights.

Figure 2:
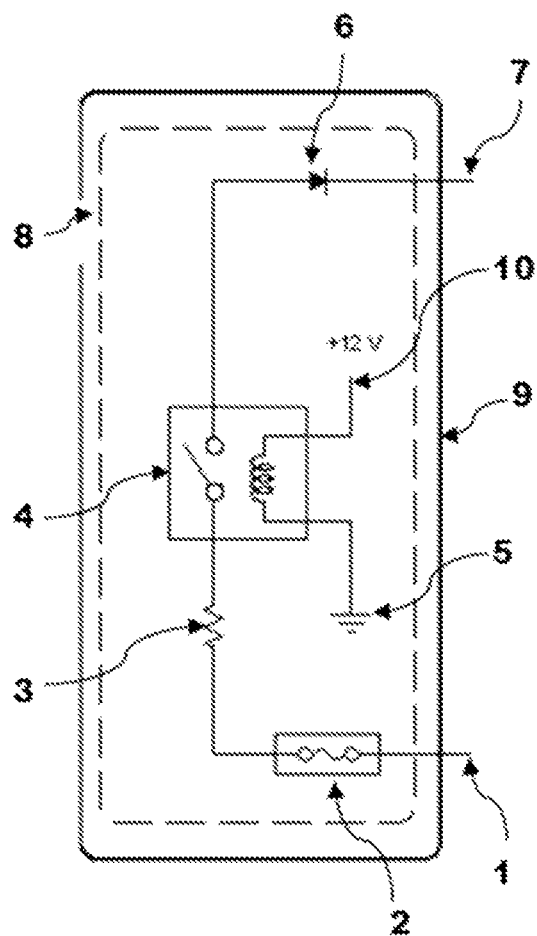
FIG. 2 is a circuit diagram of an alternate embodiment of the invention.

As shown in FIG. 2, the circuit may also include its own circuit opening and closing component or flasher 11. Circuit opening and closing component 11 are preferably circuit components or flashers that periodically and automatically open and close the circuit in an alternating pattern. As is known in the field, flashers or signal flasher may be thermoelectric, electromechanical or electronic in nature.

In yet an alternate embodiment, input 1 and output 11 can be electrically connected to a separate signaling device, such as an audible alarm or external lighting system.

The inventive reverse activated signal circuit can work in combination with the existing power source from the reverse light signal of the equipped vehicle, but are not limited to such sources. The inventive circuit can activate the emergency flashing lights circuit of a vehicle, using contacts made through existing wire connections, and causing the vehicle's signal lights to operate and flash alternately or simultaneously when the inventive circuit is activated.

The inventive circuit may include flashers, similar to those used in existing vehicles, but the additional flashers can be used when the vehicle flasher light circuit is not being utilized. Such flashers are typical automotive signal light circuitry consisting of standard electronic components.

The circuits presented utilize standard resistors which are current flow resistance components of different or similar Ohms values, but are not limited to the stated components as a means of varying the current flow to the existing vehicle lighting circuits. Where paired right or left side inventive circuits are used, the resistors for each side may be of different values as a way of generating an alternative flashing light sequence. The alternate flashing light sequence can provide different types of signals from a vehicle's standard turning or hazard lighting signals. Equal resistor values would allow the inventive circuit to control simultaneously signaling.

When the invention is activated the vehicle operator will see the existing in-dash four-way flasher signal arrow lights activated as an indication that the vehicle is actually in reverse, hence an additional improvement to an intentionally or accidentally reversing of an vehicle.

While certain novel features of the present invention have been shown and described, it will be understood that various omissions, substitutions and changes in the forms and details of the device illustrated and in its operation can be made by those skilled in the art without departing from the spirit of the invention.

I claim:

1. An electric circuit for controlling a vehicle's existing signal equipment, the electric circuit comprising:
    an input terminal connected to a vehicle signal circuit;
    a switch connected in series to the input terminal, the switch having an external control input electrically connected to a reverse light circuit of the vehicle, such that activation of the reverse light circuit closes the switch and allows current to flow through the switch;
    a current flow directional component connected in series to the switch; and an output terminal connected in series to the flow directional component, the output terminal also connected to an existing signal equipment circuit on the vehicle.

2. The electric circuit of claim 1, further comprising:
    an overload circuit interrupting component connected in series between the input terminal and the switch.

3. The electric circuit of claim 1, further comprising: a resistor connected in series.

4. The electric circuit of claim 1, where the external input to the switch is electrically connected to a manually operated switch.

5. The electric circuit of claim 1, further comprising:
a flasher connected in series, where the flasher provides an intermittent opening and closing of the electric circuit.

6. An electric circuit for controlling a vehicle's existing signal lighting, the electric circuit comprising:
an input terminal connected to a vehicle signal light circuit;
an overload circuit interrupting component connected in series to the input terminal;
a resistor connected in series to the overload circuit interrupting component;
a switch connected in series to the resistor, the switch having an external control input electrically connected to a reverse light circuit of the vehicle, such that activation of the reverse light circuit closes the switch and allows current to flow through the switch;
a current flow directional component connected in series to the switch; and
an output terminal connected in series to the flow directional component, and connected to the vehicle signal light circuit.

7. The electric circuit of claim 6, further comprising:
a flasher connected in series, where the flasher provides an intermittent opening and closing of the electric circuit.

\* \* \* \* \*